May 15, 1934.  W. C. ANTHONY ET AL  1,958,405
MOWER
Filed Feb. 18, 1932   2 Sheets-Sheet 2
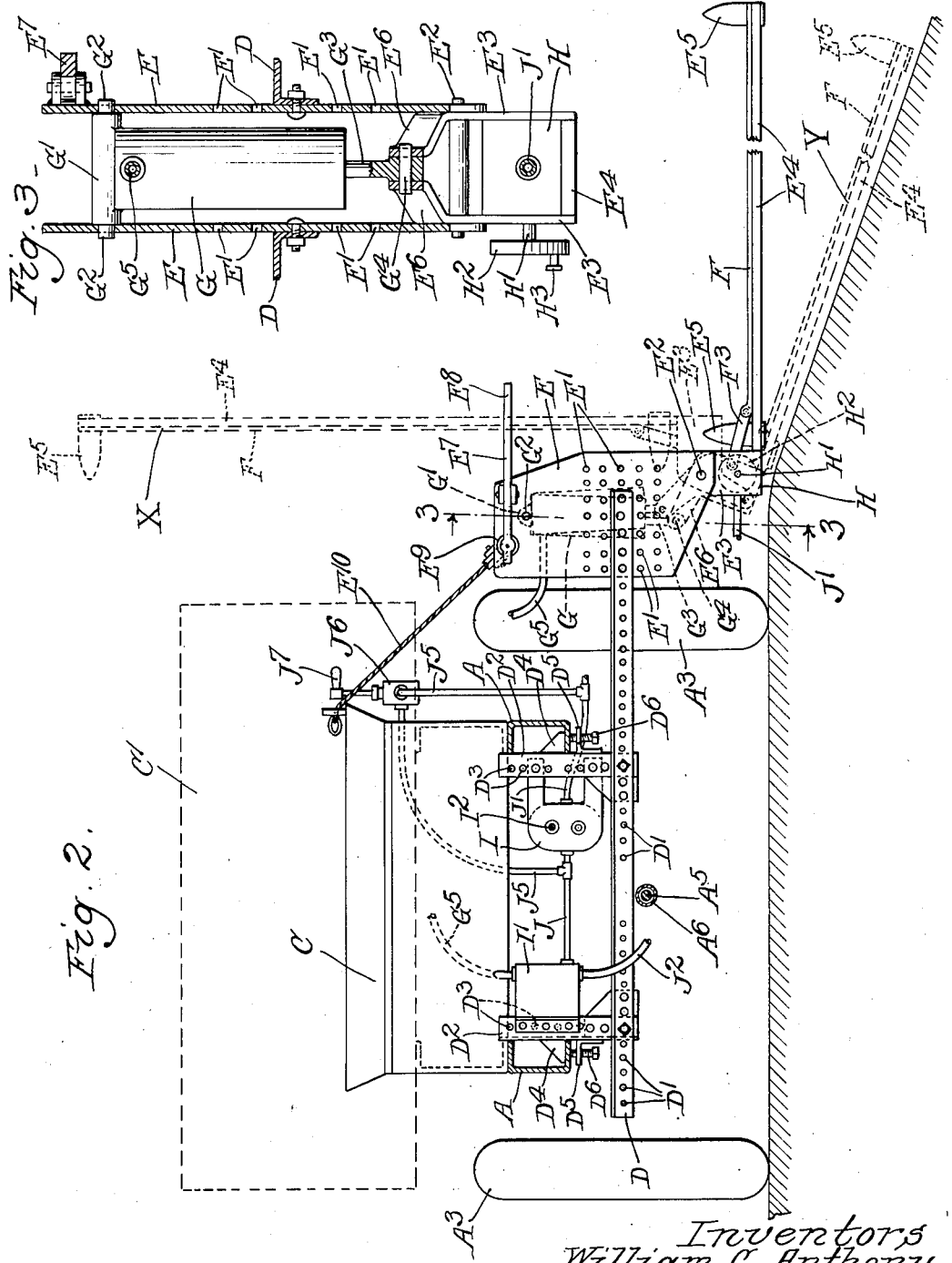
Inventors
William C. Anthony
Lester Wachter
by Parker & Carter
Attorneys Patented May 15, 1934

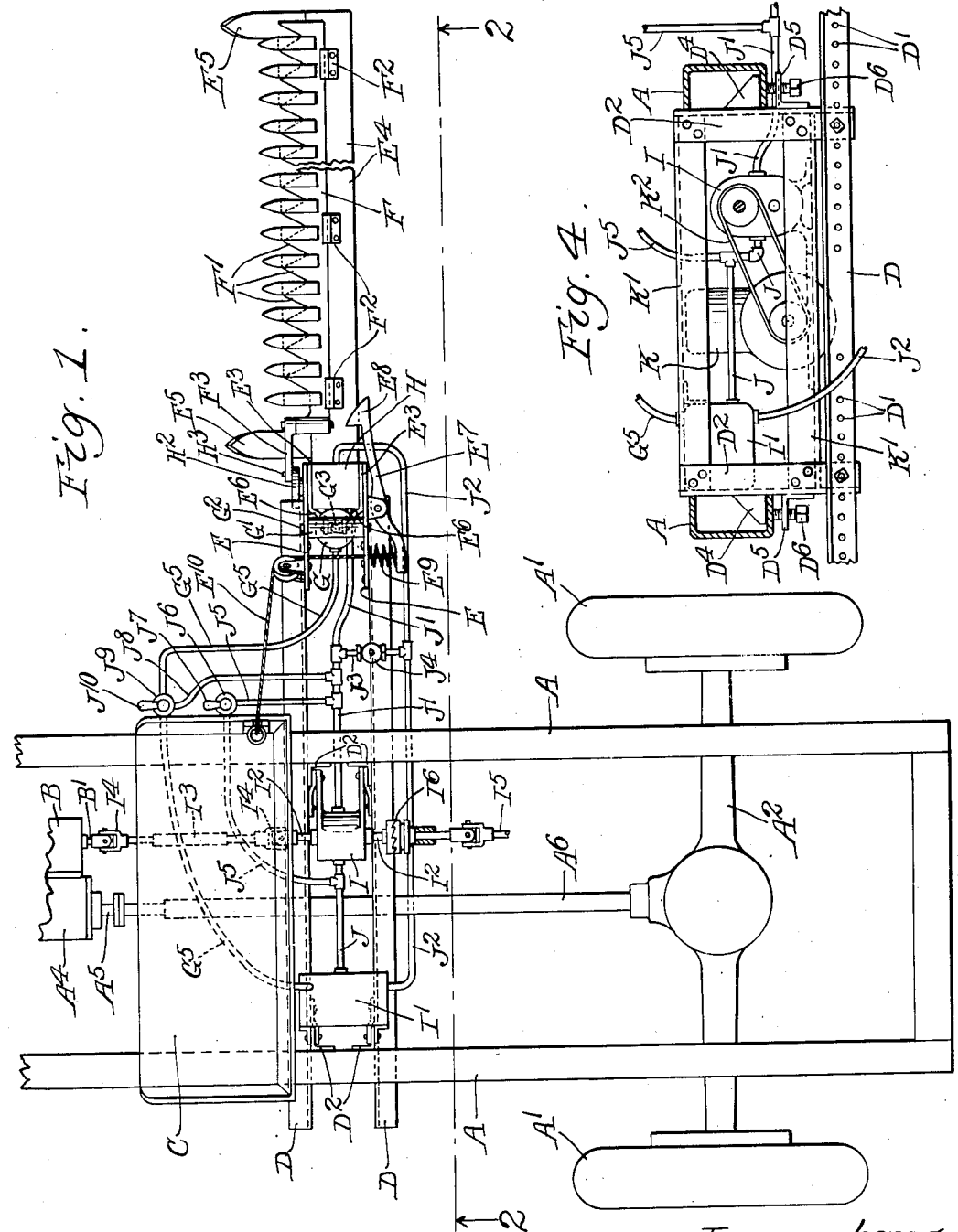

1,958,405

UNITED STATES PATENT OFFICE 1,958,405

MOWER

William C. Anthony and Lester Wachter, Streator, Ill., assignors to Anthony Company, Streator, Ill., a corporation of Illinois Application February 18, 1932, Serial No. 593,707

16 Claims. (Cl. 56—25)

This invention relates to a mower and particularly to a detachable power driven mower assembly, adapted as a whole to be removably mounted on a vehicle.

One object is to provide such a mechanism adapted to be removably mounted on an automotive vehicle and arranged to be driven by the engine of the vehicle. Another object is to provide such a mower mechanism arranged to be driven by power separate from that of the vehicle. Another object is to provide in connection with a removably mounted power driven mower assembly a sickle bar which can operate through a wide vertical zone of adjustment.

Other objects will appear from time to time in the specification and claims.

The invention is illustrated more or less diagrammatically in the accompanying drawings, wherein:—

Figure 1 is a plan view, with parts broken away, showing the assembly mounted upon a truck and arranged to be driven by the truck engine;

Figure 2 is a transverse vertical cross section taken at line 2—2 of Figure 1;

Figure 3 is a longitudinal vertical cross sectional detail, taken on an enlarged scale, at line 3—3 of Figure 2;

Figure 4 illustrates a modified form in which a separate power source is provided for driving the sickle bar.

Like parts are designated by like characters throughout the specification and drawings.

As shown, the invention is mounted on a truck, although actually it might be mounted on any sort of vehicle. The truck is shown diagrammatically as having a frame A, formed of suitable side members. At its rear it is supported on wheels $A^1$ which are carried from an axle $A^2$. At its forward end the truck is supported on wheels $A^3$ and is provided with any suitable engine. None is shown as its details form no particular part of the present invention. A transmission $A^4$ is mounted with the engine and a shaft $A^5$, arranged in a suitable housing $A^6$, drives the wheels $A^1$.

Within a power take-off housing B is mounted a power take-off which includes a shaft $B^1$, projecting outwardly from the housing B.

Any suitable seat C, for a driver, may be mounted on the frame A and a load carrying body $C^1$ is shown in Figure 2. This body may or may not be used and if used, it may be arranged to tip or dump.

Mounted on the vehicle frame is the mower assembly frame. As shown it consists preferably of a pair of angles D, D, which are perforated as at $D^1$ $D^1$ to provide a plurality of points of attachment. Adjustably fastened in the perforations $D^1$ and extending outwardly from the angles D are upright attaching members $D^2$ which are arranged to engage the side members of the frame A. The members $D^2$ may be provided with a plurality of perforations $D^3$ by means of which they may be adjusted and by means of which portions of the assembly which are attached to them may be adjustably positioned. Preferably each of the members $D^2$ has a supporting lug $D^4$ secured upon it and these lugs may rest, as shown in Figure 2, upon a flange of the frame member A. Opposite each of the supporting lugs $D^4$ may be mounted upon the member $D^2$ a bracket $D^5$. A set screw $D^6$ is positioned in the bracket $D^5$ and may be adjusted to engage the lower portion of a flange of the channel section of the frame. Thus the mower frame assembly may be adjustably positioned so as to be supported from the frame of the vehicle.

Adjustably positioned preferably at one end of the mower assembly frame is a pair of plates E. As shown these plates are provided with a plurality of perforations $E^1$, by means of which they may be attached to the frame members D in a large number of different positions of adjustment. Pivoted between the plates E on a shaft $E^2$ is a sickle bar carrier $E^3$. Extending laterally from it and preferably from a point adjacent its lower edge is a sickle bar frame $E^4$ which may carry at either end a runner or guide shoe $E^5$. Adjacent its upper end the carrier $E^3$, which may be formed of a pair of plates as shown particularly in Figure 3, is reduced in size and provided with a pair of lateral lever arm extensions $E^6$. The sickle bar and frame may be rotated up and down by moving the lever arm $E^6$ up and down. When the sickle bar is not to be used, it may be raised substantially to the vertical position indicated at X in Figure 3, and in that position it may be engaged by a retaining latch $E^7$ mounted on one of the plates E, provided with an engaging point or nose $E^8$ and provided with a compression spring $E^9$ which tends normally to hold the latch in a position to engage the sickle bar when the latter is raised to contact it. A cord or cable $E^{10}$ is fastened to the end of the latch adjacent the spring $E^9$ and may be pulled and thus used to compress the spring $E^9$ and to move the latch out of the engaging position and thus to free the sickle bar and frame so that it may be returned to the operative position.

F is a sickle bar carrying blades or cutting portions $F^1$. It is mounted for reciprocation in one or more guides $F^2$. The sickle bar may have attached to it a link $F^3$, by means of which it may be reciprocated in a manner and by a mechanism which will be described below.

It is frequently desirable when the sickle bar assembly is in use, to alter its position of inclination. One position is indicated in full lines in Figure 3 and a second position of use is indicated in dotted lines as at Y in Figure 3. The sickle bar assembly is arranged to be raised and lowered so as to accommodate it for use on surfaces of varying inclinations with respect to the surface upon which the vehicle is moving.

One means for accomplishing this adjustment is shown in the drawings. As there shown, it comprises a fluid pressure system and particularly a fluid pressure cylinder G which may be provided with a trunnion portion $G^1$ having pins $G^2$ fitting within perforations in the plates E, E, to provide a bearing whereby the cylinder is pivoted between the plates. A piston, not shown in detail, is fitted within the cylinder and provided with a rod $G^3$ which extends out of the cylinder and is journalled at its lower end to the lever extensions $E^6$ as at $G^4$. Thus movement of the piston in or out of the cylinder may move the rod $G^3$ and with it move the lever arms $E^6$ up or down and correspondingly raise or lower the sickle bar assembly. $G^5$ is a fluid pressure pipe or conduit by means of which fluid pressure within the cylinder is controlled to adjust and control the position of the piston within the cylinder. Fluid pressure may be supplied to the cylinder from any suitable source. The arrangement shown in the drawings and described below is merely one possible means for supplying fluid pressure to the cylinder.

As one means for reciprocating the sickle bar, a rotary fluid motor may be used. There is shown in the drawings a rotary fluid pressure motor. It is indicated generally as at H and is positioned between the members $E^3$ so as to move with them and thus when the sickle bar assembly is raised or lowered, the motor moves with it. The motor H is provided with a shaft $H^1$ which may carry a flywheel $H^2$ within which a pin $H^3$ is eccentrically mounted. The link $F^3$ which is joined at one end to the sickle bar F is journalled at its other end upon the eccentric pin $H^3$ and rotary movement of the flywheel $H^2$ is translated into reciprocatory movement of the sickle bar. Pressure for operating the motor may be furnished from the same source as that which furnishes pressure for controlling the movement of the piston within the cylinder G. However, the two might be operated from separate sources.

One form of pressure operating assembly for operating the sickle bar motor and the sickle bar adjusting cylinder comprises a rotary pump I which may, for example, be a gear pump but might be any suitable pressure creating means, and a sump or tank $I^1$. The pump I is preferably arranged to be driven from the power take-off, that is to say, from the shaft $B^1$, the pump shaft $I^2$ being arranged to be driven from the shaft $B^1$ by a shaft $I^3$ through suitable universal joints $I^4$, $I^4$. Where the vehicle upon which the mower assembly is mounted is also equipped with a dumping body so that the latter is to be tipped or dumped by power from the vehicle engine, it may be convenient to take power from the power take-off for operating the dumping mechanism and for this purpose it may be convenient to join a hoist shaft $I^5$ to the pump shaft $I^2$. For this purpose a jaw clutch $I^6$ may be used. Thus the power is transmitted to the hoisting mechanism from the power take-off through the pump. The pump I and the sump $I^1$ are fastened to the upright members $D^2$ and by reason of the perforations $D^3$ in the members $D^2$, the pump and the sump may be vertically adjusted, if perforations $D^3$ are used.

J is a pipe leading from the sump to the intake side of the pump. $J^1$ is a pipe leading from the outlet or discharge side of the pump to the motor H. $J^2$ is a return pipe or connection from the motor to the sump $I^1$. Leading from the motor supply pipe $J^1$ to the return pipe $J^2$ is a safety by-pass pipe $J^3$ within which a safety valve $J^4$ is positioned. The purpose of this by-pass is to prevent breakage in case for any reason the sickle bar or its driving parts jam or encounter excessive opposition to movement. When that develops and when the further operation of the motor H is for that reason unduly impeded, pressure instead of destroying the motor or other parts of the assembly, opens the safety valve $J^4$ and thus fluid is by-passed from the pipe $J^1$, through the pipe $J^3$, the safety valve $J^4$, and back through the return pipe $J^2$ to the sump. This operation will continue as long as the excessive resistance remains or until the power is shut off. $J^5$ is a by-pass pipe connected to the pump supply or intake pipe J and to the pump discharge or outlet pipe $J^1$. It is provided with a by-pass valve $J^6$ and an operating handle $J^7$ therefor. This by-pass may be manipulated to vary the amount of fluid supplied to the fluid motor H and thus to vary the speed of reciprocation of the sickle bar. The pipe or conduit $G^5$, above mentioned as supplying fluid to the cylinder G, is connected at one end to that cylinder and at the other end to the sump $I^1$. It communicates also with a branch $J^8$, which communicates with the pump discharge or outlet pipe $J^1$. A three-way valve $J^9$ is situated to control passage through the pipe $G^5$ and the pipe $J^8$ and is provided with an operating handle $J^{10}$. The three-way valve $J^9$ is arranged so that it can be manipulated to cause fluid to flow from the pump outlet pipe $J^1$ through the pipes $J^8$ and $G^5$ to the upper part of the cylinder G to cause the piston to move outwardly in the cylinder and thus to depress the lever arms $E^6$ and to raise the sickle bar assembly. When it is desired to lower the sickle bar, the three-way valve $J^9$ is moved to permit fluid to flow from the cylinder, through the pipe $G^5$, past the valve $J^9$ and into the sump. The weight of the sickle bar is sufficient to move the piston inwardly into the cylinder when an escape is provided for fluid from the cylinder.

In Figure 4 is shown a modified form in which a separate pump driving motor K is shown as mounted on the members $K^1$, $K^1$ and in which a belt $K^2$ is shown for driving the pump. Otherwise the mechanism remains essentially the same as that shown in the earlier figures. An assembly of this sort is practically complete within itself and in no way depends upon the existence of an engine or other power source in the vehicle and thus such an assembly, with a separate internal combustion motor K, might be mounted on a horse drawn or hand propelled vehicle or on any sort of a vehicle which itself does not have an engine.

Where the engine K is used, the pump and hydraulic motor become in effect nothing but a hydraulic or fluid transmission for transmitting the power of the motor K to move the sickle bar. Of course, a mechanical transmission might be used instead of the fluid transmission.

It will be realized that whereas we have herewith shown and described a practical operative device, nevertheless many changes might be made in the size, shape, number and disposition of parts without departing from the spirit of the invention and we wish, therefore, that our showing be taken as in a sense diagrammatic.

In particular, no matter what the power source, whether it be a separate engine or the driving engine of the vehicle or any other engine mounted upon the vehicle itself, the sickle bar might be driven from such engine by any suitable transmission mechanism and although we have shown a rotary hydraulic motor in one form of the invention, a reciprocating hydraulic drive might be used instead of the rotary hydraulic motor.

The use and operation of this invention are as follows:

The mower of this invention may be mounted on any vehicle or running gear sufficient to support it and to serve as a means for carrying it along when it is to be used. If it be mounted upon an automotive vehicle such as a truck, it may be arranged to be driven by the truck engine. This form of the invention is illustrated particularly in Figures 1 and 2. When it is thus to be mounted upon a truck, with the power take-off, the carrying frame of the mower assembly is suitably adjusted and positioned upon and attached to the frame of the vehicle. Its position up or down with respect to the vehicle frame is adjustable as shown and its position in or out is also adjustable. Thus it may be moved in or out with respect to the vehicle frame so as to put the sickle bar closer to or farther from the path of the vehicle, depending upon the type of ground over which it is to be moved and upon the ground over which it is to cut.

As illustrated particularly in Figure 2, the parts are mounted upon a truck and adjusted so that as the truck is driven along a road, the sickle bar may cut to the side of the road, for example, cutting the right-of-way off the road surface. As the surface of the right-of-way is usually at an angle to the surface of the road, the sickle bar is adjusted up or down to compensate for this. This is accomplished by operating the pump and adjusting the two-way valve $J^9$ so that fluid is forced from the pump into the cylinder G to move the piston outward and thus to raise the sickle bar to the position shown in full lines in Figure 2. From time to time this position may be adjusted to accommodate different surfaces over which cutting must be done. This is done either by forcing further fluid into the cylinder to raise the sickle bar or by allowing some fluid to escape from the cylinder to permit the sickle bar to be lowered. These operations are accomplished by manipulation of the valve $J^{10}$ and in the case where the sickle bar is to be raised, by operating the pump sufficiently to force additional fluid into the cylinder.

With the sickle bar in the proper position of adjustment, it may be retained in that position by manipulating the valve $J^9$ to prevent escape of fluid from the cylinder. When it is desired to cut, the pump is operated either from the vehicle engine or from the independent engine shown in Figure 4 and the motor H or its equivalent is thus operated to cause reciprocation of the sickle bar. In the form of the invention shown herewith, the speed of the motor, and consequently the speed of reciprocation of the sickle bar, is controlled by setting the by-pass valve $J^6$ so that a greater or less amount of fluid is permitted to be by-passed and thus a greater or less amount of fluid is forced to the motor and its speed is consequently increased or decreased. Thus by control of the position of the valve $J^9$ the vertical position of adjustment of the sickle bar is accomplished, and by control of the valve $J^6$ the speed of reciprocation of the sickle bar is controlled. These two controls, together with the sickle bar itself, are preferably located so that the operator who drives the vehicle may also conveniently operate and control the sickle bar in all of its operations and may observe it from the driver's seat at the same time he drives the vehicle.

Where the device is mounted on a dumping truck in which a hoisting mechanism is arranged to be driven from the power take-off of the vehicle engine, the drive shaft for the vehicle dumping mechanism is preferably removed to permit insertion of the pump and its drive shaft. When the mower assembly is removed again from the vehicle, the original drive shaft for the hoisting mechanism is re-inserted.

In certain dumping bodies which are hydraulically operated and which, therefore, as ordinarily made, include a hydraulically operated pump and sump assembly, the device of this invention may be connected to that pump and sump assembly so that the motor H, or other means for reciprocating the sickle bar, may be driven from the hydraulic system of the dumping body without necessity of providing any extra or additional hydraulic pressure source. Where the vehicle is not provided with a hydraulic dumping mechanism, the hydraulic or other fluid drive is formed as part of the detachable mower assembly.

We claim:

1. In combination, a frame, parts attached thereto and arranged for removable attachment of said frame to a vehicle for support therefrom, and mower driving means mounted on the frame, a mower assembly mounted upon such frame, power means for adjusting the position of the mower, and transmission means connecting the mower and the driving means.

2. In combination, a frame, parts attached thereto and arranged for removable attachment of said frame to a vehicle for support therefrom, and mower driving means mounted on the frame, a mower assembly mounted upon such frame, power means for adjusting the position of the mower and for holding the mower in such adjusted position, and transmission means connecting the mower and the driving means.

3. In combination, a frame, parts attached thereto and arranged for removable adjustable attachment of said frame to a vehicle for support therefrom, and mower driving means mounted on the frame, a mower assembly movably mounted upon such frame, and transmission means connecting the mower and the driving means and a mower driving engine on said mower assembly.

4. In combination, a frame, parts attached thereto and arranged for removable adjustable attachment of said frame to a vehicle for support therefrom, and mower driving means mounted on the frame, a mower assembly movably mounted upon such frame, power means for adjusting the position of the mower and for holding the mower in such adjusted position, and transmission means connecting the mower and the driving means.

5. In combination, a frame, parts attached thereto and arranged for removable attachment of said frame to a vehicle for support therefrom, and mower driving means mounted on the frame, a mower assembly mounted upon such frame, and transmission means connecting the mower and the driving means including a mower driving engine mounted on the mower assembly, and a control for said transmission means, whereby the mower is stopped and started and its speed of motion controlled.

6. In combination, a frame, parts attached thereto and arranged for removable adjustable attachment of said frame to a vehicle for support therefrom, and mower driving means mounted on the frame, a mower assembly movably mounted upon such frame, and transmission means connecting the mower and the driving means including a mower driving engine mounted on the mower assembly, and a control for said transmission means, whereby the mower is stopped and started.

7. In combination, a frame, parts attached thereto and arranged for removable adjustable attachment of said frame to a vehicle for support therefrom, and mower driving means mounted on the frame, a mower assembly movably mounted upon such frame, power means for adjusting the position of the mower with respect to the frame, and for holding the mower in such adjusted position, and transmission means connecting the mower and the driving means, and a control for said transmission means, whereby the mower is stopped and started and its speed of motion controlled.

8. In combination with an automotive vehicle having a driving engine, a power mower assembly, a frame therefor, supporting parts mounted on said frame and adapted removably to engage a vehicle, mower supporting parts mounted on said frame, a mower mounted in said supporting parts, power means for adjusting the position of said mower, comprising a cylinder movably carried in said supporting parts and provided with a part active upon the mower supporting parts, and a sickle bar in the mower and means for reciprocating it, including drive means actuated by the vehicle engine and mounted in said frame and a transmission from said drive means to said sickle bar, for moving the latter.

9. In combination with an automotive vehicle having a driving engine, a power mower assembly, a frame therefor, supporting parts mounted on said frame and adapted removably to engage a vehicle, mower supporting parts mounted on said frame, a mower mounted in said supporting parts, power means for adjusting the position of said mower, comprising a cylinder movably carried in said supporting parts and provided with a part active upon the mower supporting parts, and a sickle bar in the mower and means for reciprocating it, including drive means actuated by the vehicle engine and mounted in said frame and a transmission from said drive means to said sickle bar, for moving the latter, and control means for said transmission whereby adjustment of the sickle bar is controlled.

10. In combination with an automotive vehicle having a driving engine, a power mower assembly, a frame therefor, supporting parts mounted on said frame and adapted removably to engage a vehicle, mower supporting parts mounted on said frame, a mower mounted in said supporting parts, power means for adjusting the position of said mower, comprising a cylinder movably carried in said supporting parts and provided with a part active upon the mower supporting parts, and a sickle bar in the mower and means for reciprocating it, including drive means actuated by the vehicle engine and mounted in said frame and a transmission from said drive means to said sickle bar for moving the latter, and means for controlling the speed of movement of the sickle bar irrespective of the speed of the vehicle engine.

11. In combination with an automotive vehicle having a driving engine, a power mower assembly, a frame therefor, supporting parts mounted on said frame and adapted removably to engage a vehicle, mower supporting parts mounted on said frame, a mower adjustably and movably mounted in said supporting parts, and power means for adjusting the position of said mower, comprising a pivotally mounted cylinder movably carried in said supporting parts and provided with a part active upon the mower supporting parts, and a sickle bar in the mower and means for reciprocating it, including drive means actuated by the vehicle engine and mounted in said frame and a transmission from said drive means to said sickle bar, for moving the latter.

12. In combination with an automotive vehicle having a driving engine, a power mower assembly, a frame therefor, supporting parts mounted on said frame and adapted removably to engage a vehicle, mower supporting parts mounted on said frame, a mower adjustably and movably mounted in said supporting parts, and power means for adjusting the position of said mower, comprising a pivotally mounted cylinder movably carried in said supporting parts and provided with a part active upon the mower supporting parts, and a sickle bar in the mower and means for reciprocating it, including drive means actuated by the vehicle engine and mounted in said frame and a transmission from said drive means to said sickle bar, for moving the latter, and control means for said transmission whereby adjustment of the sickle bar is controlled, and means for controlling the speed of movement of the sickle bar, irrespective of the speed of the vehicle engine.

13. In combination with an automotive vehicle having a driving engine, a power mower assembly, a frame therefor, supporting parts adjustably mounted on said frame and adapted removably to engage a vehicle, mower supporting parts adjustably mounted on said frame, a mower adjustably and movably mounted in said supporting parts, power means for adjusting the position of said mower, comprising a pivotally mounted cylinder movably carried in said supporting parts and provided with a part active upon the mower supporting parts, and a sickle bar in the mower and means for reciprocating it, including drive means actuated by the vehicle engine and mounted in said frame and a transmission from said drive means to said sickle bar, for moving the latter, and control means for said transmission whereby adjustment of the sickle bar is controlled, and means for controlling the speed of movement of the sickle bar, irrespective of the speed of the vehicle engine.

14. In combination, a detachable mower arranged for removable mounting and support upon a vehicle and comprising a vehicle engaging assembly with parts arranged for engagement with a vehicle, and a sickle bar assembly, mounted upon the vehicle engaging assembly, means for driving the sickle bar mounted upon the vehicle engaging assembly, and transmission means connecting the driving means and the sickle bar including a driving engine mounted upon said sickle bar, whereby the sickle bar may be moved by the driving means.

15. In combination, a detachable mower arranged for removable mounting and support upon a vehicle and comprising a vehicle engaging assembly with parts arranged for engagement with a vehicle, and a sickle bar assembly, adjustably mounted upon the vehicle engaging assembly, means for driving the sickle bar mounted upon the vehicle engaging assembly, and transmission means connecting the driving means and the sickle bar including a driving engine mounted upon said sickle bar, whereby the sickle bar may be moved by the driving means.

16. In combination, a detachable mower arranged for removable mounting upon a vehicle and comprising a vehicle engaging assembly with parts arranged for engagement with a vehicle, and a sickle bar assembly, mounted upon the vehicle engaging assembly, means for driving the sickle bar, and transmission means connecting the driving means and the sickle bar, whereby the sickle bar may be moved by the driving means, and power means for adjusting the position of the sickle bar and transmission means connecting said power means with the driving means, whereby the latter moves the former to cause adjustment of the position of the sickle bar.

WILLIAM C. ANTHONY.
LESTER WACHTER.